United States Patent [19]

Palmer

[11] 4,440,256
[45] Apr. 3, 1984

[54] BEARING AND UNIVERSAL JOINT ASSEMBLY

[75] Inventor: Bertram J. Palmer, Staffordshire, England

[73] Assignee: GKN Transmissions Limited, Birmingham, England

[21] Appl. No.: 298,899

[22] Filed: Sep. 2, 1981

[30] Foreign Application Priority Data

Sep. 13, 1980 [GB] United Kingdom ................ 8029666

[51] Int. Cl.³ .............................................. B60K 17/30
[52] U.S. Cl. ...................................... 180/254; 29/520; 180/259; 308/191; 464/906
[58] Field of Search .............. 180/259, 258, 255, 254; 29/520; 308/189 R, 191; 403/261, 359; 464/139, 906

[56] References Cited

U.S. PATENT DOCUMENTS 4,240,680 12/1980 Krude et al. ..................... 180/259

FOREIGN PATENT DOCUMENTS

| 565098 | 11/1932 | Fed. Rep. of Germany . |
| 2848169 | 5/1979 | Fed. Rep. of Germany ...... 180/254 |
| 1553973 | 1/1969 | France . |
| 2376322 | 7/1978 | France . |
| 6510222 | 3/1966 | Netherlands ........................ 180/254 |
| 1267395 | 3/1972 | United Kingdom . |
| 1447078 | 8/1976 | United Kingdom . |
| 1553258 | 9/1979 | United Kingdom . |

Primary Examiner—David M. Mitchell
Assistant Examiner—D. Lynn Fugate
Attorney, Agent, or Firm—Merriam, Marshall & Bicknell

[57] ABSTRACT

An assembly of a bearing unit with inner and outer members and rolling elements between them and a universal joint member, with a retaining element which has been deformed to hold the members together and removal of which to permit dismantling of the assembly leaves at least one of the members undamaged and fit for further service. Torque transmission between the members may be by way of tapered splines.

3 Claims, 2 Drawing Figures

BEARING AND UNIVERSAL JOINT ASSEMBLY

BACKGROUND TO THE INVENTION

1. Field of the Invention

This invention relates to a wheel support assembly or a motor vehicle, comprising a bearing unit and a universal joint by which the wheel can be driven.

Vehicle steel supporting assemblies have been proposed hitherto in which a bearing member is either formed integrally with or non-detachably secured to a universal joint member, usually the outer member of a constant velocity ratio universal joint. Any wear in either the bearing or universal joint requires scrapping of the entire assembly since it cannot be dismantled to replace any of the components thereof. Such a combined assembly is, however, attractive since it enables a reduction of weight to be achieved as compared with the most common arrangement used hitherto, which comprises a separate hub, bearings, and universal joint.

2. Summary of the Invention

It is an object of the present invention to provide a wheel-supporting assembly which enables light weight to be achieved as compared with assemblies generally used hitherto, but which is capable of having parts replaced when wear occurs.

According to the invention, we provide a wheel-support assembly for a motor vehicle, comprising a bearing unit with an inner member adapted to be secured to a vehicle wheel, an outer member adapted to be secured to a suspension component of a vehicle, and a plurality of rolling elements rotatably mounting the inner member relative to the outer member; a universal joint member; a retaining element holding said universal joint member to said inner bearing member, which retaining element has been permanently deformed to effect such holding; and inter-engaging formations on said universal joint member and inner bearing member for torque transmission therebetween, at least one of said universal joint member and bearing member remaining undamaged by removal of said retaining element to dismantle the assembly.

The retaining element may be integral with the universal joint member or bearing inner member, in which case only the other of said members will remain fit for further use after their separation. In many cases the life of a bearing unit is potentially greater than that of a universal joint, and thus the retaining element is preferably provided on the universal joint member.

Alternatively, the retaining element may be a separate component engaging both the bearing member and universal joint member.

The universal joint member and bearing inner member may have tapered splined portions which engage to provide for torque transmission between them. This facilitates correct alignment between the two members during assembly.

BRIEF DESCRIPTION OF DRAWINGS

The invention will now be described by way of example with reference to the accompanying drawings, of which

DESCRIPTION OF PREFERRED EMBODIMENTS

Figure 1:
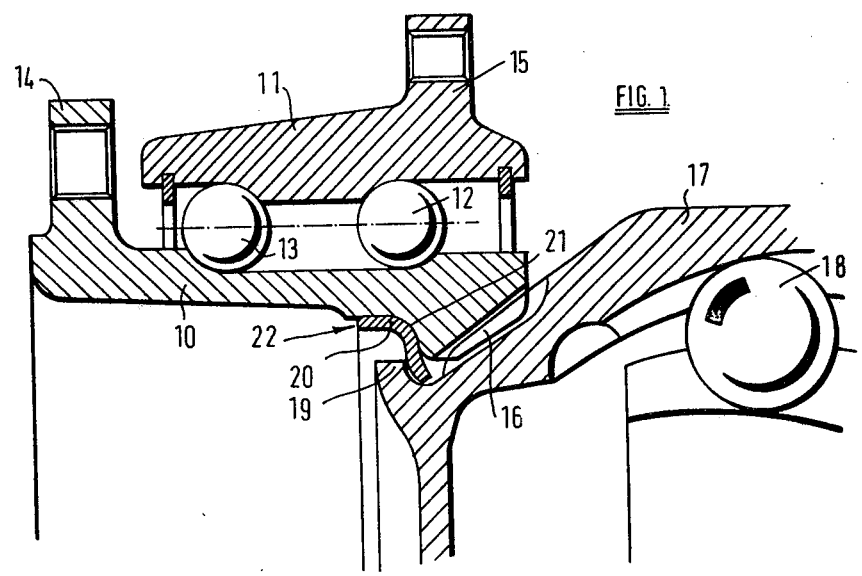
FIG. 1 is a section through part of an assembly embodying the invention.

Referring firstly to FIG. 1, the assembly comprises a double row angular contact ball bearing with an inner member 10, an outer member 11, and two rows of balls 12, 13 disposed between them and engaging respective bearing surfaces thereon. Although not illustrated, it will be appreciated that the balls 12, 13 will be held in a cage, and there will be provided suitable lubricant retaining seals. The inner member 10 has an integral flange 14 for securing to a wheel and, where applicable, a brake disc or drum, and the outer member 11 has a flange 15 for attachment to a suitable suspension component to support the assembly in a motor vehicle.

The inner bearing member 10 has a frusto-conical surface 16 with tapered spline teeth, which engage for torque transmission with complementary teeth provided on the outer member 17 of a constant velocity ratio universal joint. The universal joint illustrated is of the type with balls 18 received in grooves in inner and outer joint members for torque transmission therebetween. At its innermost end with respect to the assembly, the joint outer member 17 has an outwardly turned lip 19.

The bearing inner member and universal joint outer member are held together by an annular retaining element 20, which fits against a curved or angled surface 21 in the bearing inner member and engages behind the lip 19 on the joint outer member. The retaining element 20 is of sheet metal, e.g. mild steel and has been deformed in situ to hold the two members together.

Initially, the retaining element 20 has an inwardly directed flange of a dimension which will pass over the external surface of lip 19. In manufacturing the assembly, the bearing inner member and joint outer member are placed together with splines engaging, and the retaining element inserted and pressed in the direction of arrow 22. The inwardly directed flange of the retaining element is deformed by the surface 21 in the inner bearing member, so that it engages behind the lip 19 to hold the assembly together.

If replacement of either the bearing unit or universal joint becomes necessary because of wear, the retaining element would be machined away. This does not damage either the bearing inner member or universal joint outer member so that which ever one of these components is worn can be replaced. A new retaining member would be used in reassembly.

Figure 2:
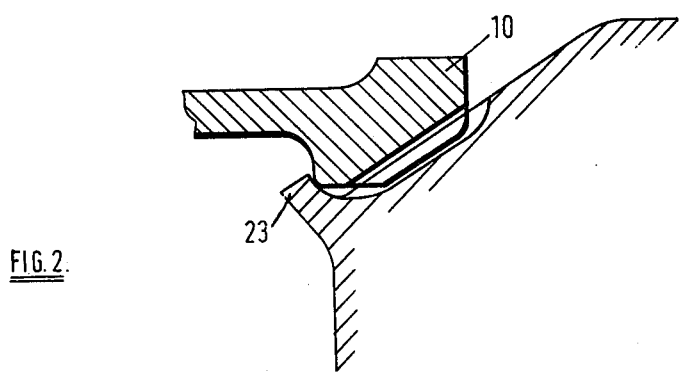
FIG. 2 a section illustrating a modification of the assembly of FIG. 1.

Referring now to FIG. 2, there is illustrated a modified form of assembly in which, instead of a separate retaining element being used, the joint outer member 17 has a lip 23 which is itself deformed after the joint outer member has been assembled with the bearing inner member, to hold these components together. Dismantling would necessitate machining away of the lip 23, so that the universal joint outer member could not be re-used once the assembly has been dismantled. The bearing unit, however, could be used with a new universal joint.

By virtue of the use of the tapered splined portions of the bearing inner member and universal joint member for torque transmission between them, alignment between these members is automatically achieved. The deformation of the integral or separate retaining element with these components in assembled relation compensates for variations in manufacturing tolerances. It should further be noted that the splined portions are capable of being manufactured by metal forming techniques not requiring subsequent machining, enabling economies in manufacture to be effected.

I claim:

1. A wheel support assembly for a motor vehicle, comprising a bearing unit having an inner bearing member adapted to be secured to a vehicle wheel, an outer bearing member adapted to be secured to a suspension component of the vehicle, and a plurality of rolling elements disposed between said bearing members and rotatably mounting said inner bearing member relative to said outer bearing member; a universal joint member, interengaging formations on said universal joint member and inner bearing member for torque transmission therebetween, a retaining element comprising a separate annular component, permanently deformed to engage with formations in both said universal joint member and bearing inner member to hold said inner bearing member and universal joint member together, and at least one of said universal joint member and inner bearing member remaining undamaged by removal of said retaining element to dismantle the assembly.

2. An assembly according to claim 1 wherein said interengaging formations for torque transmission comprise splines provided on tapered portions of said universal joint member and inner bearing member.

3. A wheel support assembly for a motor vehicle, comprising a bearing unit having an inner bearing member adapted to be secured to a vehicle wheel, an outer bearing member adapted to be secured to a suspension component of the vehicle, and a plurality of rolling elements disposed between said bearing members and rotatably mounting said inner bearing member relative to said outer bearing member; a universal joint member, interengaging formations on said universal joint member and inner bearing member for torque transmission therebetween comprising splines provided on tapered portions of said universal joint member and inner bearing member, and a retaining formation, integral with said universal joint member, and permanently deformed into engagement with a co-operating formation on said inner bearing member to hold said members together, said inner bearing member remaining undamaged by removal of said retaining formation to dismantle the assembly.

* * * * *